United States Patent Office 2,938,049
Patented May 24, 1960

2,938,049
9,10-DIHYDRO-11,12-DIOXY-9,10-ETHANO-ANTHRACENE AND ESTERS THEREOF

William K. Johnson, Dayton, Ohio, and Tad L. Patton, Houston, Tex., assignors to Monsanto Chemical Company, St. Louis, Mo., a corporation of Delaware No Drawing. Filed Oct. 4, 1956, Ser. No. 613,834

7 Claims. (Cl. 260—471)

This invention relates to anthracene derivatives, and more particularly provides 9,10-dihydro-11,12-dioxy-9,10-ethano-anthracene compounds.

The methods and products of this invention are illustrated by the following equations:

Equation 1

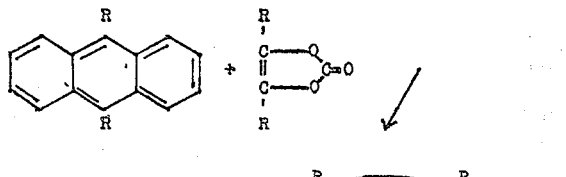

Equation 2

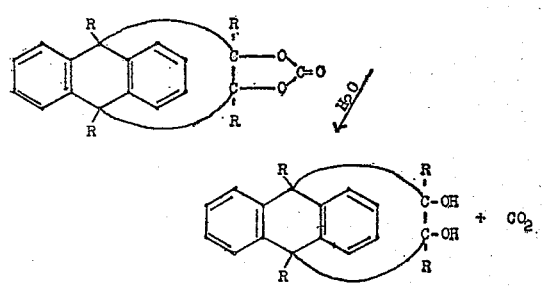

Equation 3

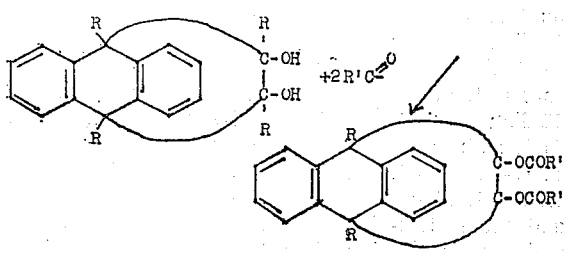

Equation 4

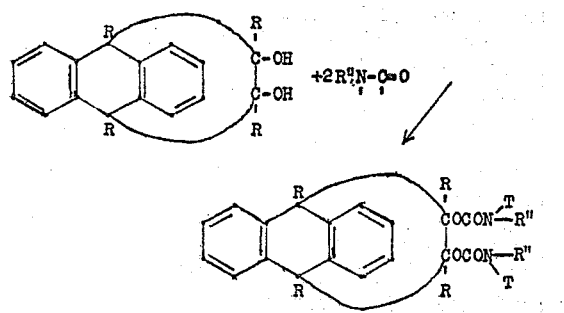

where R is H or a lower alkyl, R' is $C_{1-12}$ hydrocarbon, R" is a $C_{1-18}$ radical containing 0–5 halogen atoms, and T is H or R".

In accordance with the first equation above, a vinylene carbonate is contacted with anthracene or a 9- and/or 10-alkyl-substituted anthracene to give a Diels-Alder adduct having the illustrated structure, which is the cyclic carbonate ester of a 9,10-dihydro-9,10-ethanoanthracene-11,12-diol. The ease with which this reaction takes place, and the very good yields obtained thereby, are surprising, for we have found that the susceptibility of vinylene carbonate to Diels-Alder adduct formation is not generally equivalent to that of other cyclic dienophiles. Thus, for example, while maleic anhydride readily forms an adduct with furan in good yield, vinylene carbonate was not found to add to furan even at 180° C. and on prolonged heating.

The vinylene carbonates useful in the present synthesis are of the structure.

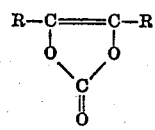

where R is hydrogen or a lower alkyl radical. Vinylene carbonates of this type are readily prepared, e.g., by reaction of ethylene oxide, propylene oxide, butylene oxide, or similar alkyloxiranes with carbon dioxide to give vic-alkylene carbonates, which are then halogenated and subsequently dehydrohalogenated to produce the vinylene carbonate derivative. Examples of suitable vinylene carbonates for use in the reaction of the invention are vinylene carbonate, methylvinylene carbonate, ethylvinylene carbonate, dimethylvinylene carbonate, butylvinylene carbonate, etc. When vinylene carbonate, of the formula

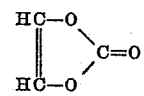

is employed in the present synthesis, particularly suitable this dienophile may be prepared by the vapor phase dehydrochlorination of chloroethylene carbonate as described in copending application Serial No. 399,828, filed December 22, 1953, by Tad Le Marre Patton, one of the present inventors.

Dienes which are employed in the synthesis of the present adducts include anthracene and 9- and/or 10-alkyl anthracenes, e.g., 9-methylanthracene, 9,10-dimethylanthracene, 9,10-diethylanthracene, 9,10-dipropylanthracene, 9-amylanthracene, etc.

In carrying out the formation of the present adduct, the vinylene carbonate is simply contacted with the anthracene compound until formation of the adduct has occurred. Since this is a 1:1 addition reaction, usually the reactants will be present in equimolecular quantities; but if desired, one of the reactants may be present in excess of that required for the reaction, since unreacted starting material is readily removed from the reaction mixture at the end of the reaction, e.g., by distillation. While the presence of a solvent is not necessary, adduct formation with the present dienes is generally facilitated by the use of a solvent or diluent. Examples of suitable reaction solvents are, e.g., aromatic or aliphatic hydrocarbons such as benzene, toluene, kerosene, and naphtha; chlorinated solvents such as o-dichlorobenzene and ethylene dichloride; oxygenated solvents such as acetophenone and 2-(2-ethoxyethoxy)ethyl acetate, etc. The addition of the vinylene carbonate to the anthracene hydrocarbon takes place readily at atmospheric pressure when the reactants are refluxed in a solvent at elevated temperatures. When low-boiling solvents are employed, advantageously the reactants are contacted under superatmospheric pressure, to make possible the attainment of temperatures at which adduct formation proceeds at practicable rates. The temperature range for adduct formation in accordance with this invention is generally from 100° to 250° C., and preferably, 150°–200° C. Subatmospheric pressures may be employed to produce reflux of the reactants at these temperatures under suitable reaction conditions. On completion of the reaction, the products are readily isolated, e.g., by distilling off solvents or unreacted starting material.

Examples of the adducts provided by the above procedure are: the cyclic carbonate of 9,10-dihydro-9,10-ethanoanthracene-11,12-diol; the cyclic carbonate of 9-(10H)-methyl-9,10-ethanoanthracene-11,12-diol; the cyclic carbonate of 9,10-dihydro-9,10-dimethyl-9,10-ethanoanthracene-11,12-diol; the cyclic carbonate of 9,10-dihydro-11-methyl-9,10-ethanoanthracene-11,12-diol; the cyclic carbonate of 9,10-dihydro-11,12-dimethyl-9,10-ethanoanthracene-11,12-diol; the cyclic carbonate of 9(10H),11-dimethyl-9,10-ethanoanthracene-11,12-diol; the cyclic carbonate of 11-ethyl-9,10-dihydro-9,10-dimethyl-9,10-ethanoanthracene-11,12-diol; the cyclic carbonate of 9,10-dihydro-11-isoamyl-9,10-ethanoanthracene-11,12-diol; the cyclic carbonate of 9(10H)-amyl-9,10-ethanoanthracene-11,12-diol, etc.

The invention is further illustrated, but not limited, by the following examples:

*Example 1*

Anthracene in the amount of 17.8 grams (0.1 mole), vinylene carbonate in the amount of 8.6 grams (0.1 mole), and dry xylene in the amount of 65 ml., were mixed in the glass liner of a 300-ml. capacity reaction bomb. The bomb was sealed, and rocked continuously at 180° C. for 20 hours.

On opening the bomb, 21 grams of crude, light-brown colored crystals were removed. These crystals were recrystallized from benzene giving a product having a melting point of 253–254° C. The product was again recrystallized, this time from toluene, and the resulting product dried and subjected to analysis for carbon and hydrogen, with the following results, stated as weight percent:

|   | Found | Calcd. for $C_{17}H_{12}O_3$ |
|---|---|---|
| C | 77.72 | 77.27 |
| H | 4.85 | 4.57 |

The product is the adduct of vinylene carbonate with anthracene and has the following structure:

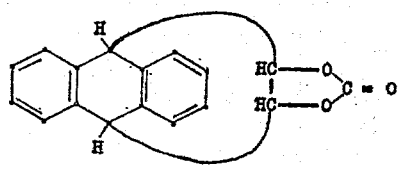

*Example 2*

The procedure of the above experiment was repeated with larger quantities of reactants: 43 g. (0.5 mole) of vinylene carbonate, 89 g. (0.5 mole) of anthracene, and 250 ml. of dry toluene. After 18 hrs. at 180° C., the product was isolated and recrystallized from toluene. Eighty grams of the adduct, M.P. 253–4° C., were obtained; this represents a 60.6% yield.

*Example 3*

A mixture of 0.5 mole vinylene carbonate, about 0.5 mole of technical anthracene, and 250 ml. of o-dichlorobenzene was refluxed for 45 hours. Upon cooling, the adduct separated as a solid, which was recrystallized from chlorobenzene; yield, 72%.

Similarly, by addition of methylvinylene carbonate to 9,10-dimethylanthracene, there is obtained the cyclic carbonate of 9,10-dihydro-9,10,11-trimethyl-9,10-ethanoanthracene-11,12-diol.

The aforementioned carbonates are relatively stable compounds; for example, on refluxing the product of Example 1 with p-thiocresol in monochlorobenzene for 22 hours, the starting materials were recovered substantially unchanged. However, we have found that the carbonates can be cleaved to form reactive diols in accordance with Equation 2 above, by treatment with hydrolysis catalysts.

In hydrolyzing the carbonate to the diol, the carbonate is simply contacted with a hydrolysis catalyst, preferably in an ionizing solvent medium. Either acidic or basic hydrolysis catalysts may be used in the present reaction. Examples of the former are mineral acids such as hydrochloric, sulfuric or phosphoric acids. Particularly preferred are alkaline hydrolysis catalysts, such as sodium hydroxide, sodium or potassium carbonate, etc. When an acidic hydrolysis catalyst is used, such catalyst need be present only in catalytic amount, e.g., from 0.1 to 20% and preferably 1%–5% by weight of the carbonate. When an alkaline catalyst is used, because the alkali reacts with the carbonate to form a salt, a molar equivalent of alkali or greater with respect to the carbonate ester should be employed. The solvent medium for the reaction may be any ionizing solvent, such as water, ethyl alcohol, or mixtures thereof; 2-ethoxyethanol, dioxane, etc. If the hydrolysis reaction is carried out in solution in a lower alkyl alcohol, such as ethanol, using an acidic hydrolysis catalyst, the products of the reaction may include, in addition to the desired dihydroethanoanthracene diol, the dialkyl carbonate corresponding to the alkyl alcohol employed as solvent. The dialkyl carbonate may then be recovered at the end of the reaction, e.g., by distillation.

The temperature at which the hydrolysis is carried out may vary from ambient room temperature up to the reflux temperature of the mixture. While atmospheric pressures are generally useful, sub- or superatmospheric pressures may be applied to the reaction if desired. On completion of the reaction, the solvent is removed and the product diol isolated by extraction, etc.

Illustrative of the compounds obtainable by the above procedure are: 9,10-dihydro-9,10-ethanoanthracene-11,12-diol; 9(10H)-methyl-9,10-ethanoanthracene-11,12-diol; 9,10-dihydro-9,10-dimethyl-9,10-ethanoanthracene-11,12-diol; 9,10-dihydro-9,10-diethyl-9,10-ethanoanthracene-11,12-diol; 9,10-dihydro-9,10-diamyl-9,10-ethanoanthracene-11,12-diol; 9(10H)-ethyl-9,10-ethanoanthracene-11,12-diol; 9,10-dihydro-11-methyl-9,10-ethanoanthracene-11,12-diol; 11-ethyl-9,10-dihydro-9,10-ethanoanthracene-11,12-diol; 9,10-dihydro-11-isobutyl-9,10-ethanoanthracene-11,12-diol; 9,10-dihydro-11,12-dimethyl-9,10-ethanoanthracene-11,12-diol; 9(10H),11-dimethyl-9,10-ethanoanthracene-11,12-diol; 9(10H),12-dimethyl-9,10-ethanoanthracene-11,12-diol; 11-amyl-9,10-dihydro-9,10-ethanoanthracene-11,12-diol, etc.

The present unique glycols are cyclic vic-diols free of aliphatic unsaturation and containing two aromatic nuclei. They are useful for a wide variety of applications. One aspect of the utility of the present diols concerns their use as starting materials for esterifications. Thus, as illustrated hereinbelow, they may be reacted with monobasic acids or anhydrides or halides thereof to form monomeric esters having application in the chemical and allied industries. When the present diols are reacted with polybasic acids under esterifying conditions, there are formed useful novel polyesters.

Usual conditions for condensation polymerizations, i.e., extended heating, good agitation, and a blanketing inert atmosphere, must be employed in the preparation of polyesters. Thus, for example, one of the present diols, such as the product of Example 1 above, may be heated with a dibasic acid such as sebacic acid in the presence of an esterification catalyst such as p-toluene sulfonyl chloride, until esterification is complete as shown by the acid value of the charge, to produce a resin useful, e.g., for formulation as an enamel. Alternatively, the present diols may be employed as a modifier in an alkyd resin synthesis employing a drying oil. Thus, for example, linseed oil is alcoholized with glycerine in amount equal to one quarter of the oil, using $Ca(OH)_2$ as catalyst. Then succinic anhydride and 9,10-dihydro-9,10-ethanoanthracene-11,12-diol are added together with methyl p-toluene-sulfonate, and the charge is heated until the acid number has fallen below 10. A coating resin is obtained. The preparation of polyester resins employing, inter alia, dihydric alcohols such as are provided by this invention, is described, for example, in a Monsanto Chemical Company publication, "The Chemistry and Processing of Alkyd Resins."

The present diols are also of particular and unique utility as starting materials for the preparation of dialdehydes, as described in copending application Serial No. 613,827, filed of even date herewith by T. L. Patton, one of the present applicants, and assigned to the same assignee as the present application and now U.S. Patent 2,857,434. In accordance with the aforesaid copending application, cyclic vic-diols are subjected to oxidative cleavage whereby there are obtained difunctional carbonyl compounds having utility as starting materials for resin synthesis and for other applications. The anthracene adduct derivatives prepared by the method of the present application are of particular interest for this application, inasmuch as these adducts are free of aliphatic unsaturation. Diels-Alder adducts derived from the addition of a vinylene carbonate to one of the common dienes, such as butadiene, cyclopentadiene, etc., are olefinically unsaturated materials. Thus, for example, when vinylene carbonate is reacted with 2,3-dimethylbutadiene to form an adduct which may be hydrolyzed to a diol as described by M. S. Newman and R. W. Addor, J. Amer. Chem. Soc. 75, 1263–4, the product is an olefinically unsaturated cyclohexene derivative. By contrast, the present diols contain only stable aromatic unsaturation, and on cleavage yield a stable dialdehyde which is free of aliphatic unsaturation.

The present diols are also useful for a variety of other purposes, e.g., as agricultural pesticides; as plasticizers; as pharmaceutical agents; as dielectrics, etc.

The invention is illustrated by the following, non-limiting examples:

*Example 4*

Ten g. (0.037 mole) of the cyclic carbonate of 9,10-dihydro-9,10-ethanoanthracene-11,12-diol was mixed with 1.5 g. (0.037 mole) of sodium hydroxide in 100 ml. of water and 100 ml. of ethyl alcohol. The mixture was refluxed 2 hours, and then let stand overnight. Removal of alcohol by distillation at water aspirator vacuum resulted in precipitation of the product as a flocculent white solid. The dried product weighed 8.5 grams (96.5% yield). After treatment with activated charcoal and four recrystallizations from hexane-toluene, a sample of the product melted at about 203° C. and analyzed as follows:

|  | Found | Calcd. for $C_{16}H_{14}O_2$ |
|---|---|---|
| Percent C | 80.78 | 80.67 |
| Percent H | 6.15 | 5.88 |

This new polycyclic glycol, which is 9,10-dihydro-9,10-ethanoanthracene-11,12-diol, has the formula

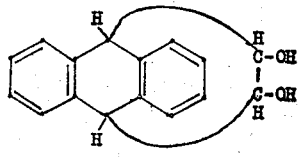

*Example 5*

A mixture of 39.6 g. (0.15 mole) of 9,10-dihydro-9,10-ethanoanthracene-11,12-diol cyclic carbonate, 12.0 g. (0.3 mole) of sodium hydroxide, and 700 cc. of a 50–50 mixture of ethanol and water was refluxed until 1 hour after the solution became clear and homogeneous. About half of the solvent was removed by distillation, and the remaining reaction mixture was cooled and filtered. A total of 34 g. of the diol (95% yield) were obtained.

By esterification of the diols described above, new and useful esters are obtained. One type of the new bicyclic carboxylic acid esters provided by the present invention is represented by the formula

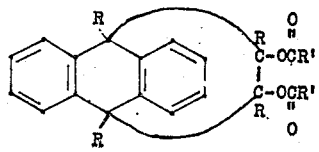

where each R is hydrogen or lower alkyl, and R' is a hydrocarbon radical containing up to 12 carbon atoms. Esters of the above formula are readily prepared by contacting the present diols with a carboxylic acid compound of the formula

where X is OH, halogen, or

i.e., with an acid, acid halide, or acid anhydride, desirably in the presence of an esterification catalyst. Examples of suitable carboxylic acids which may be used in preparing the present esters are, e.g., olefinic and acetylenic unsaturated acids such as acrylic, vinylacetic, and propiolic acid; aromatic acids such as benzoic acid; cycloalkanoic acids such as cyclohexanecarboxylic acid; and fatty acids such as butyric acid, 2-ethylhexanoic acid, etc. Acid halides which may be used to prepare the esters include propionyl chloride, p-toluyl bromide, etc.; acid anhydrides useful in the present ester synthesis include acetic anhydride, butyric anhydride, benzoic anhydride, etc.

Diesters of monocarboxylic acids provided by the present invention include, e.g., 9,10-dihydro-9,10-ethanoanthracene-11,12-diyl diacetate, 9,10-dihydro-9,10-ethanoanthracene-11,12-diyl dipropionate, 9,10-dihydro-9,10-ethanoanthracene-11,12-diyl bis-(2-ethylhexanoate), 9,10-dihydro-9,10-ethanoanthracene-11,12-diyl didodecanoate, 9,10-dihydro-9,10-ethanoanthracene-11,12-diyl diacrylate, 9,10-dihydro-9,10-ethanoanthracene-11,12-diyl dibenzoate, 9,10-dihydro-9,10-ethanoanthracene-11,12-diyl di-2-naphthoate, 9,10-dihydro-9,10-ethanoanthracene-11,12-diyl di-p-toluate, 9,10-dihydro-9,10-ethanoanthracene-11,12-diyl bis(phenylacetate), 9,10-dihydro-9,10-ethanoanthracene-11,12-diyl dicyclohexylcarboxylate, 9,10-dihydro-9,10-ethanoanthracene-11,12-diyl bis(3-phenylpropionate), 9(10H)-methyl-9,10-ethanoanthracene-11,12-diyl dibutyrate, 9(10H)-methyl-9,10-ethanoanthracene-11,12-diyl bis(vinylacetate), 9(10H)-methyl-9,10-ethanoanthracene-11,12-diyl di-o-toluate, 9,10-dihydro-9,10-dimethyl-9,10-ethanoanthracene-11,12-diyl diacetate, 9,10-dihydro-11-methyl-9,10-ethanoanthracene-11,12-diyl dibenzoate, 11-isoamyl-9,10-dihydro-9,10-ethanoanthracene-11,12-diyl diacrylate, 9,10-dihydro-11,12-dimethyl-9,10-ethanoanthracene-11,12-diyl bis(phenylacetate), 9(10H),11-dimethyl-9,10-ethanoanthracene-11,12-diyl diacetate, 9(10H)-n-butyl-9,10-ethanoanthracene-11,12-diyl dipropionate, etc.

To prepare the present esters, the diol is contacted with the acid or acid derivative, preferably in the presence of an esterification or condensation catalyst. Suitable dehydrating condensation catalysts are, for example, mineral acids such as sulfuric or hydrochloric acids, or gaseous hydrogen chloride, or a salt of a weak organic acid, such as sodium acetate. Heating is usually unnecessary, the reaction commonly being exothermic, especially when reactive acid derivatives such as the acid halide or anhydride are employed. Conveniently, the reactants are cooled while they are mixed, and the mixture is later heated to drive the reaction to completion. Depending on the reactants, solvents or diluents may or may not be used, i.e., a solvent will be necessary if both reactants are solid at reaction temperature. Sub- or superatmospheric pressures may be applied to the reaction mixture if desired. At least two acid equivalents should be present per mole of glycol to be esterified; that is, two mole equivalents of acid or acid halide, or one mole equivalent of acid anhydride are required in order to satisfy the two hydroxy groups of the glycol and form the diester of the formula illustrated above. If desired, excess acid or acid derivative may be employed to drive the reaction towards completion; unreacted acid or diol is then removed at the end of the reaction. The reaction promoter, i.e., the condensation catalyst such as hydrochloric acid, need be present in only catalytic amounts.

The preparation of the present carboxylic acid esters is illustrated by the following example:

*Example 6*

To acetic anhydride in the amount of 50 ml. (50 grams, 0.49 mole), containing 1 ml. concentrated HCl, was added 4.7 g. (0.02 mole) of 9,10-dihydro-9,10-ethanoanthracene-11,12-diol. This reaction mixture was refluxed for 2 hours, after which acetic acid and acetic anhydride were removed at reduced pressure. The resulting acetylated residue, after recrystallization from toluene and drying, had a melting point of 158–159° C. and weighed 5.1 g. (yield, 79.2%). The material was subjected to analysis for carbon and hydrogen with the following results, stated as weight percent:

|   | Found | Calcd. for $C_{20}H_{18}O_4$ |
|---|---|---|
| C | 74.66 | 74.53 |
| H | 5.83 | 5.65 |

This new ester of 9,10-ethyleneglycol-9,10-dihydroanthracene is the diacetate, having the following formula:

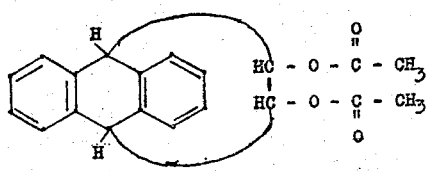

*Example 7*

Similarly, by the reaction of 9,10-dihydro-9,10-dimethyl-9,10-ethanoanthracene-11,12-diol with benzoyl chloride in the presence of a few drops of hydrochloric acid, there is prepared 9,10-dihydro-9,10-dimethyl-9,10-ethanoanthracene-11,12-diyl dibenzoate.

In addition to the carboxylic acid esters of 9,10-dihydro-9,10-ethanoanthracene-11,12-diols, the present invention also includes certain carbamate esters of these diols.

Carbamic acid esters are preferably derived from isocyanates, when the N-monosubstituted derivative is desired, and from carbamyl halides, when the N-disubstituted derivatives are required. These esters have the general formula

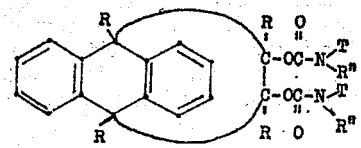

where R is lower alkyl, T is H or R″, and R″ is a radical free of aliphatic unsaturation and containing up to 18 carbon atoms, selected from hydrocarbon radicals and halohydrocarbon radicals substituted by from 1 to 5 Cl or Br atoms; by aliphatic unsaturation is here meant olefinic or acetylenic unsaturation.

To prepare the present N-monosubstituted carbamates, of the above formula when T is H, there may be used any alkyl, cycloalkyl, aralkyl or aryl monoisocyanate of the formula R″NCO where R″ is as defined above. The isocyanates are readily available, commercial materials; they may be prepared, e.g., by reaction of a primary amine with phosgene. Examples of isocyanates suitable for use in the present process and of the above formula where R″ is a hydrocarbon radical are: alkyl isocyanates such as methyl isocyanate, ethyl isocyanate, propyl isocyanate, n-hexyl isocyanate, hexadecyl isocyanate, octadecyl isocyanate, etc.; cycloalkyl isocyanates such as cyclohexyl isocyanate; aryl isocyanates such as phenyl isocyanate, p-tolyl isocyanate, 2-naphthyl isocyanate, etc.; and aralkyl isocyanates, such as phenethyl isocyanate, etc.

Illustrative of esters which may be prepared therewith are:

9,10-dihydro-9,10-ethanoanthracene-11,12-diyl bis(methylcarbamate),
9,10-dihydro-9,10-ethanoanthracene-11,12-diyl bis(octadecylcarbamate),
9,10-dihydro-9,10-ethanoanthracene-11,12-diyl dicarbanilate,
9,10-dihydro-9,10-ethanoanthracene-11,12-diyl bis(m-tolylcarbamate),
9,10-dihydro-9,10-ethanoanthracene-11,12-diyl bis(3-phenylpropylcarbamate),
9(10H)-methyl-9,10-ethanoanthracene-11,12-diyl bis(isopropylcarbamate),
9(10H)-methyl-9,10-ethanoanthracene-11,12-diyl bis(o-tolylcarbamate),
9(10H)-methyl-9,10-ethanoanthracene-11,12-diyl bis(cyclohexylcarbamate),
9,10-dihydro-9,10-dimethyl-9,10-ethanoanthracene-11,12-diyl bis(butylcarbamate),
9,10-dihydro-9,10-dimethyl-9,10-ethanoanthracene-11,12-diyl dicarbanilate,
9,10-dihydro-11-methyl-9,10-ethanoanthracene-11,12-diyl bis(decylcarbamate),
9,10-dihydro-11-isoamyl-9,10-ethanoanthracene-11,12-diyl bis(cuminylcarbamate),
9(10H)-butyl-9,10-ethanoanthracene-11,12-diyl bis(methylcarbamate),
9(10H),11-dimethyl-9,10-ethanoanthracene-11,12-diyl dicarbanilate, etc.

A second class of presently useful isocyanates of the formula R″NCO where R″ is free of aliphatic unsaturation and contains 1–18 C atoms consists of those isocyanates wherein R″ is a hydrocarbon radical substituted by 1 to 5 Cl or Br atoms. Exemplary of these isocyanates are chloromethyl isocyanate, bromomethyl isocyanate, 2-chloroethyl isocyanate, 1,2,2-trichloroethyl isocyanate, pentachlorooctadecyl isocyanate, 4-bromocyclohexyl isocyanate, o-, m-, and p-chlorophenyl isocyanate, 2-methyl-4-chlorophenyl isocyanate, 2,4-dichlorophenyl isocyanate, 2,4,5-trichlorophenyl isocyanate, pentachlorophenyl isocyanate, 4-chloro-2-naphthyl isocyanate, 5-bromo-1-naphthyl isocyanate, 2,2-dichloro-2-phenylethyl isocyanate, etc.

Dicarbamate esters which may be prepared by reaction of the present diols with halogenated isocyanates include 9,10-dihydro-9,10-ethanoanthracene-11,12-diyl bis(chloromethylcarbamate),
9,10-dihydro - 9,10-ethanoanthracene - 11,12 - diyl bis(2-bromoethylcarbamate),
9,10-dihydro-9,10-ethanoanthracene - 11,12 - diyl bis(trichloroethylcarbamate),
9,10-dihydro-9,10-ethanoanthracene - 11,12 - diyl bis(dichlorooctadecylcarbamate),
9,10-dihydro-9,10 - ethanoanthracene - 11,12 - diyl bis(p-chlorocarbanilate),
9,10-dihydro-9,10 - ethanoanthracene - 11,12 - diyl bis(o-chlorophenethylcarbamate),
9(10H)-methyl-9,10-ethanoanthracene-11,12 - diyl bis(2-chloropropylcarbamate),
9(10H)-amyl - 9,10 - ethanoanthracene - 11,12 - diyl bis-(chloromethylcarbamate),
9,10-diethyl-9,10-dihydro-9,10-ethanoanthracene - 11,12-diyl bis(m-chlorocarbanilate),
9,10-dihydro-11-methyl-9,10-ethanoanthracene-11,12-diyl bis(m-bromocarbanilate),
9,10-dihydro-11-isopropyl-9,10-ethanoanthracene - 11,12-diyl bis(pentachlorocarbanilate),
11,12-diethyl-9,10-dihydro-9,10-ethanoanthracene - 11,12-diyl bis(trichlorobutylcarbamate),
9(10H),11-di-n-propyl-9,10-ethanoanthracene-11,12 - diyl bis(5-chloro-2-naphthylcarbamate),
9(10H),12-dimethyl-9,10-ethanoanthracene - 11,12 - diyl bis(2-phenyl-1-chloroethylcarbamate), etc.

In addition to the above-listed N-monosubstituted carbamate esters of the present diols, the N-disubstituted carbamate esters of these glycols are also included in the invention. The N-disubstituted carbamate esters may be prepared as mentioned above, by reaction of one of the diols of this invention with an N-disubstituted carbamyl halide, e.g., a dialkyl carbamyl halide such as dimethylcarbamyl chloride, bis(2-bromopropyl)carbamyl bromide, etc.; a di(aralkyl)carbamyl halide such as dibenzylcarbamyl chloride; a diarylcarbamyl halide such as diphenylcarbamyl chloride or bis(o-chlorophenyl)carbamyl bromide, etc. The N-disubstituted carbamyl chlorides are prepared, e.g., by reaction of a secondary amine with phosgene.

Products which may be prepared by the present invention include di-hydrocarbyl-carbamate esters such as: 9,10 - dihydro - 9,10 - ethanoanthracene - 11,12 - diyl bis-(dimethylcarbamate), 9,10 - dihydro - 9,10 - ethanoanthracene - 11,12 - diyl bis(dibutylcarbamate), 9,10 - dihydro - 9,10 - ethanoanthracene - 11,12 - diyl bis(dinonylcarbamate), 9,10 - dihydro - 9,10 - ethanoanthracene - 11,12 - diyl bis(diphenylcarbamate), 9,10 - dihydro - 9,10 - ethanoanthracene - 11,12 - diyl bis(dicyclohexylcarbamate), 9(10H) - methyl - 9,10 - ethanoanthracene - 11,12 - diyl bis(dipropylcarbamate), 9(10H) - methyl - 9,10 - ethanoanthracene - 11,12 - diyl bis(ditolylcarbamate), 9(10H) - t - amyl - 9,10 - ethanoanthracene - 11,12 - diyl bis(diethylcarbamate), 9,10 - dihydro - 9,10 - dimethyl - 9,10 - ethanoanthracene - 11,12 - diyl bis(dinaphthylcarbamate), 9,10 - dihydro - 11 - methyl - 9,10 - ethanoanthracene - 11,12 - diyl bis(diphenethylcarbamate), 12 - ethyl - 9,10 - dihydro - 9,10 - ethanoanthracene - 11,12 - diyl bis(diphenylcarbamate), 9(10H),11 - diisopropyl - 9,10 - ethanoanthracene - 11,12 - diyl bis-(dioctadecylcarbamate), etc.

Illustrative of halogenated N-disubstituted carbamyl halides which may be reacted with the present diols to form esters are bis(chloromethyl)carbamyl chloride, bis-(trichloromethyl)carbamyl chloride, bis(tetrabromononyl)carbamyl chloride, bis(m-chlorophenyl)carbamyl bromide, etc., as well as mixed carbamyl halides such as a mixture of bis(o-chlorophenyl)carbamyl chloride, bis-(p-chlorophenyl)carbamyl chloride, and (o-chlorophenyl)(p-chlorophenyl)carbamyl chloride. The class of halogenated carbamate esters free of amino H atoms formed in accordance with the present invention contains, e.g., 9,10 - dihydro - 9,10 - ethanoanthracene - 11,12 - diyl bis[bis(chloromethyl)carbamate], 9,10 - dihydro - 9,10 - ethanoanthracene - 11,12 - diyl bis[bis(2 - bromoethyl)carbamate], 9,10 - dihydro - 9,10 - ethanoanthracene - 11,12 - diyl bis(diperchloroethylcarbamate), 9,10 - dihydro - 9,10 - ethanoanthracene - 11,12 - diyl bis[bis-(m - chlorophenyl)carbamate], 9,10 - dihydro - 9,10 - ethanoanthracene - 11,12 - diyl bis[bis(2,4 - dichlorophenyl)carbamate], 9(10H) - methyl - 9,10 - ethanoanthracene - 11,12 - diyl bis[bis(pentachlorophenyl)carbamate], 9(10H) - methyl - 9,10 - ethanoanthracene - 11,12 - diyl bis[bis($\alpha$ - chlorocuminyl)carbamate], 9,10 - dihydro - 9,10 - dimethyl - 9,10 - ethanoanthracene - 11,12 - bis[bis(2 - chloro - 4 - nonylphenyl)carbamate], 9,10 - dihydro - 9,10 - dimethyl - 9,10 - ethanoanthracene - 11,12 - bis[bis(chloroethyl)carbamate], 9,10 - di - t - amyl - 9,10 - dihydro - 9,10 - ethanoanthracene - 11,12 - diyl bis-[bis(tribromophenyl)carbamate], 9(10H) - isobutyl - 9,10 - ethanoanthracene - 11,12 - diyl bis[bis(chlorocyclohexyl)carbamate], 9(10H),11 - dimethyl - 9,10 - ethanoanthracene - 11,12 - diyl bis[bis(chlorophenylpropyl)carbamate], etc.

The carbamate esters of the diols of the present invention are prepared by simply contacting the diol with the isocyanate or the carbamyl halide. Two moles of isocyanate or carbamyl halide are required per mole of glycol, to form the present diesters; if desired, the isocyanate or carbamyl chloride reactant may be introduced in excess of this proportion, unreacted starting material being recovered when ester formation is complete. The reaction may take place without a solvent medium, i.e., if the isocyanate is a liquid; or a solvent or diluent may be used. Suitable media for the reaction are, e.g., aromatic hydrocarbons such as benzene or toluene, aliphatic solvents such as cyclohexane or pentane, halogenated solvents such as ethylene dichloride, oxygenated solvents such as dioxane or isobutyl acetate, etc. Catalysts for the reaction such as aluminum chloride, may be used, if desired, but are generally unnecessary. The temperature at which the condensation of the diol with the isocyanate or carbamyl halide takes place may vary from room temperature up to below the decomposition temperature of the reactants, and is preferably in the range of from 50° to 120° C. The reaction proceeds readily at atmospheric pressure, though sub- or superatmospheric pressures may be employed, depending on reaction conditions. Formation of the diester is substantially complete within from a few minutes to 30 hours, depending on the reactants. On removal of solvent, the ester usually separates readily.

The preparation of the carbamates of the invention is further illustrated by the following non-limiting examples:

*Example 8*

A mixture of 0.05 mole of 9,10-dihydro-9,10-ethanoanthracene-11,12-diol, 0.1 mole of phenyl isocyanate, and 150 ml. of benzene was refluxed for 2 hours. The white solid which precipipated from the mixture on cooling was filtered off and recrystallized from butanol. There was thus obtained a 76% yield of 9,10-dihydro-9,10-enthanoanthracene-11,12-diyl dicarbanilate, M. 227–228° C., analyzing as follows:

|  | Found | Calcd. for $C_{30}H_{24}N_2O_4$ |
| --- | --- | --- |
| Percent C | 75.99 | 75.61 |
| Percent H | 5.73 | 5.08 |
| Percent N | 6.01 | 5.88 |

Example 9

A mixture of 0.05 mole of 9,10-dihydro-9,10-ethanoanthracene-11,12-diol, 0.1 mole of m-chlorophenyl isocyanate, and 200 ml. of toluene was refluxed for 20 hours. After removal of 75 ml. of solvent by distillation, the mixture was cooled to precipitate the bis(m-chlorocarbanilate) of the diol, in 92% yield. After recrystallization from toluene, the ester melted at 196–198° C. and analyzed as follows (weight percent):

|    | Found | Calcd. for $C_{30}H_{22}Cl_2N_2O_4$ |
|----|-------|-------------------------------------|
| C  | 66.25 | 66.08 |
| H  | 4.19  | 4.07  |
| Cl | 13.25 | 13.00 |

The product of this procedure has the following structure:

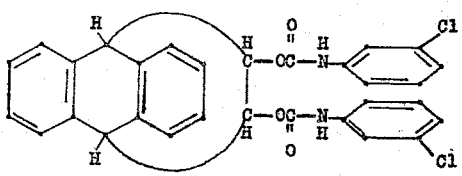

Example 10

By a similar procedure, by the reaction of 9(10H)-11-dimethyl-9,10-enthanoanthracene-11,12-diol with dimethylcarbamylchloride, there is prepared an ester of the formula

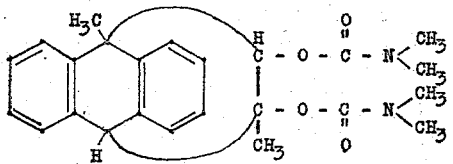

The present carboxylate and carbanilate esters are stable compounds ranging from liquids to solid crystalline materials. The carboxylate esters may be used as plasticizers, e.g., for polyvinyl chloride, and as functional fluids. The lower alkanoate esters are also of particular utility for ester interchange reactions. The present carbamate esters free of halogen atoms may be used as dielectrics. The present esters are also of utility as biological toxicants, i.e., as agricultural pesticides and pharmaceuticals. The chlorinated carbamate esters of the invention, for example, may be used as bactericides and as nematocides. Illustrative of application of these esters as bactericides is a nutrient medium containing as a preservative one of the present esters in amount toxic to bacteria; e.g., to agar normally supporting growth of *Salmonelia typhosa* and *Micrococcus pyogenes* var. *aureus* colonies is added 1% by weight of the product of Example 9.

It will be apparent to skilled stereochemists that the present diols and esters thereof may exist in a variety of stereochemical configurations. Generally, the present procedure affords cis diols and esters, but inversion thereof during the present reactions is not excluded; and cis diols when obtained, may readily be converted to the trans form by conventional procedures, i.e., via the monotosylate ester, etc. It is intended that the present invention include all of the possible stereoisomers of the present compounds, as represented by the planar formulae given herein.

While the invention has been described herein with particular reference to various preferred embodiments thereof, and examples have been given of suitable proportions and conditions, it will be appreciated that variations from the details given herein can be made without departing from the invention.

What is claimed is:

1. A polycyclic dioxy compound of the formula

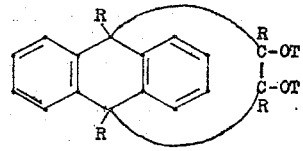

where each R is selected from the group consisting of H and lower alkyl, and T and T' taken separately are the same, and each is selected from the class consisting of carboxylate radicals of the formula

where R' is a hydrocarbon radical containing from 1 to 12 carbon atoms; and carbamate radicals of the formulae

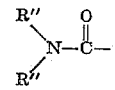

and

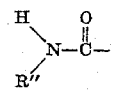

where R'' is a radical free of aliphatic unsaturation and containing only H atoms, from 1 to 12 carbon atoms, and from 0 to 5 halogen atoms having a molecular weight of from 30 to 80.

2. 9,10-dihydro-9,10-ethanoanthracene-11,12-diyl carboxylate diesters having the formula

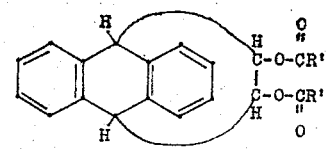

where R' is a hydrocarbon radical containing from 1 to 12 carbon atoms.

3. 9,10-dihydro-9,10-ethanoanthracene-11,12-diyl diacetate.

4. 9,10-dihydro-9,10-ethanoanthracene-11,12-diyl dicarbamate esters, having the formula

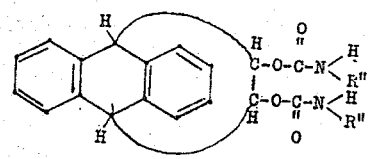

where R'' is a hydrocarbon radical free of aliphatic unsaturation and containing from 1 to 12 carbon atoms.

5. 9,10-dihydro-9,10-ethanoanthracene-11,12-diyl dicarbanilate.

6. 9,10-dihydro-9,10-ethanoanthracene-11,12-diyl bis(halohydrocarbylcarbamate) esters, having the formula

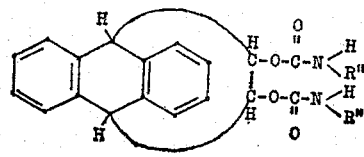

where R" is a radical free of aliphatic unsaturation and containing only H, from 1 to 12 carbon atoms, and from 1 to 5 halogen atoms having a molecular weight of from 30 to 80.

7. 9,10-dihydro-9,10-ethanoanthracene - 11,12 - diyl bis (m-chlorocarbanilate).

References Cited in the file of this patent

Bachmann et al.: "Jour. Am. Chem. Soc.," vol. 70, pp. 1458–1461 (1948).

Newman et al.: "Jour. Am. Chem. Soc.," vol. 75, pp. 1263–1264 (1953).

Elsevier's Encyclopedia, 14 Supp., 473S, 474S (1951).